US012519272B2

(12) United States Patent
Kanematsu et al.

(10) Patent No.: US 12,519,272 B2
(45) Date of Patent: Jan. 6, 2026

(54) SHIELD CONNECTOR WITH FINGER TOUCH PREVENTING RESIN PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Junichi Mukuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 315 days.

(21) Appl. No.: 18/035,881

(22) PCT Filed: Nov. 8, 2021

(86) PCT No.: PCT/JP2021/040938
§ 371 (c)(1),
(2) Date: May 8, 2023

(87) PCT Pub. No.: WO2022/107626
PCT Pub. Date: May 27, 2022

(65) Prior Publication Data

US 2023/0402797 A1 Dec. 14, 2023

(30) Foreign Application Priority Data

Nov. 17, 2020 (JP) ................................ 2020-190643

(51) Int. Cl.
*H01R 13/6581* (2011.01)
*H01R 13/405* (2006.01)

(52) U.S. Cl.
CPC ....... *H01R 13/6581* (2013.01); *H01R 13/405* (2013.01)

(58) Field of Classification Search
CPC .......................... H01R 13/6581; H01R 13/405
(Continued)

(56) References Cited

U.S. PATENT DOCUMENTS 7,824,210 B2 * 11/2010 Oka ...................... H01R 13/44 439/372
9,088,082 B2 * 7/2015 Katsui .................... H01R 13/20
(Continued)

FOREIGN PATENT DOCUMENTS

DE 4400555 A1 * 7/1994 ............ H01R 13/04
DE 102015107304 A1 11/2016
(Continued)

OTHER PUBLICATIONS

International Search Report issued on Dec. 14, 2021 for WO 2022/107626 A1 (4 pages).

*Primary Examiner* — Peter G Leigh
(74) *Attorney, Agent, or Firm* — Venjuris, P.C.

(57) ABSTRACT

A shield connector is provided with a terminal including a connecting portion to be connected to a mating terminal on a tip side and a fixing portion on a base end side, a shield shell including a tubular receptacle for surrounding the connecting portion of the terminal and a holding tube portion for surrounding the fixing portion of the terminal, a filling resin portion for integrally fixing the fixing portion of the terminal to the holding tube portion of the shield shell by filling between facing surfaces and of the fixing portion of the terminal and the holding tube portion of the shield shell,
(Continued)

and a finger touch preventing resin portion integrated with the filling resin portion and projecting from a tip surface of the connecting portion of the terminal.

6 Claims, 4 Drawing Sheets

(58) Field of Classification Search
USPC .................................................... 439/607.01
See application file for complete search history.

(56) References Cited

U.S. PATENT DOCUMENTS

| | | | | |
|---|---|---|---|---|
| 2003/0194893 | A1* | 10/2003 | Ota | H01R 13/03 439/181 |
| 2007/0149050 | A1* | 6/2007 | Oka | H01R 13/03 439/595 |
| 2011/0195606 | A1* | 8/2011 | Hsia | H01R 13/6581 439/660 |
| 2012/0252281 | A1* | 10/2012 | Hsia | H01R 13/6581 439/660 |
| 2013/0171872 | A1* | 7/2013 | Kanda | H01R 13/28 439/607.41 |
| 2014/0011406 | A1* | 1/2014 | Katsui | H01R 13/631 439/626 |
| 2015/0147898 | A1* | 5/2015 | Matsumoto | H01R 13/44 439/135 |
| 2018/0358732 | A1* | 12/2018 | Yamanashi | H01R 13/26 |

FOREIGN PATENT DOCUMENTS

| | | | | | |
|---|---|---|---|---|---|
| DE | 102015107304 | B4 | * | 2/2018 | F01L 1/352 |
| JP | 2001266986 | A | * | 9/2001 | |
| JP | 2014179290 | A | * | 9/2014 | |
| JP | 2015-011816 | A | | 1/2015 | |
| JP | 2016-062699 | A | | 4/2016 | |
| JP | 2017-224541 | A | | 12/2017 | |
| WO | WO-03012928 | A1 | * | 2/2003 | H01R 12/727 |
| WO | WO-2011030712 | A1 | * | 3/2011 | H01R 13/04 |
| WO | WO-2012099075 | A1 | * | 7/2012 | H01R 13/521 |
| WO | WO-2014046085 | A1 | * | 3/2014 | H01R 13/04 |
| WO | WO-2020216409 | A1 | * | 10/2020 | B60L 53/16 |

* cited by examiner

SHIELD CONNECTOR WITH FINGER TOUCH PREVENTING RESIN PORTION

CROSS REFERENCE TO RELATED APPLICATIONS

This application is a national phase of PCT application No. PCT/JP2021/040938, filed on 8 Nov. 2021, which claims priority from Japanese patent application No. 2020-190643, filed on 17 Nov. 2020, all of which are incorporated herein by reference.

TECHNICAL FIELD

The present disclosure relates to a shield connector.

BACKGROUND

Conventionally, a shield connector provided with an electromagnetic shielding function is used as a connector used for connection between in-vehicle devices of an electric vehicle or the like. For example, Patent Document 1 discloses a shield connector provided with a shield shell for shielding around a terminal.

In such a shield connector, since the terminal is exposed to outside when the shield connector is not connected to a mating connector, a finger touch prevention measure needs to be taken to prevent electric shock by preventing the touch of worker's fingers with the exposed terminal. Accordingly, in Patent Document 1, a measure for mounting a separate resin cover on a tip part of the terminal exposed to outside, a measure for preventing an approach of worker's fingers to the terminal by causing a shield shell to project long outward of the terminal in an axial direction and the like are proposed.

PRIOR ART DOCUMENT

Patent Document

Patent Document 1: JP2016-062699 A

SUMMARY OF THE INVENTION

Problem to be Solved

However, in a structure proposed in Patent Document 1, problems that the separate resin cover is necessary, thereby increasing the number of components and assembling man-hours, and the enlargement of the shield shell and the entire shield connector is unavoidable have been inherent.

Accordingly, a shield connector of a novel structure is disclosed in which a measure for preventing finger touch with a terminal can be taken while miniaturization is achieved with a small number of components.

Means to Solve the Problem

The present disclosure is directed to a shield connector with a terminal including a connecting portion to be connected to a mating terminal on a tip side and a fixing portion on a base end side, a shield shell including a tubular receptacle for surrounding the connecting portion of the terminal and a holding tube portion for surrounding the fixing portion of the terminal, a filling resin portion for integrally fixing the fixing portion of the terminal to the holding tube portion of the shield shell by filling between facing surfaces of the fixing portion of the terminal and the holding tube portion of the shield shell, and a finger touch preventing resin portion integrated with the filling resin portion, the finger touch preventing resin portion projecting from a tip surface of the connecting portion of the terminal.

Effect of the Invention

According to the shield connector of the present disclosure, a measure for preventing finger touch with a terminal can be taken while miniaturization is achieved with a small number of components.

DETAILED DESCRIPTION TO EXECUTE THE INVENTION

Description of Embodiments of Present Disclosure

Figure 1:
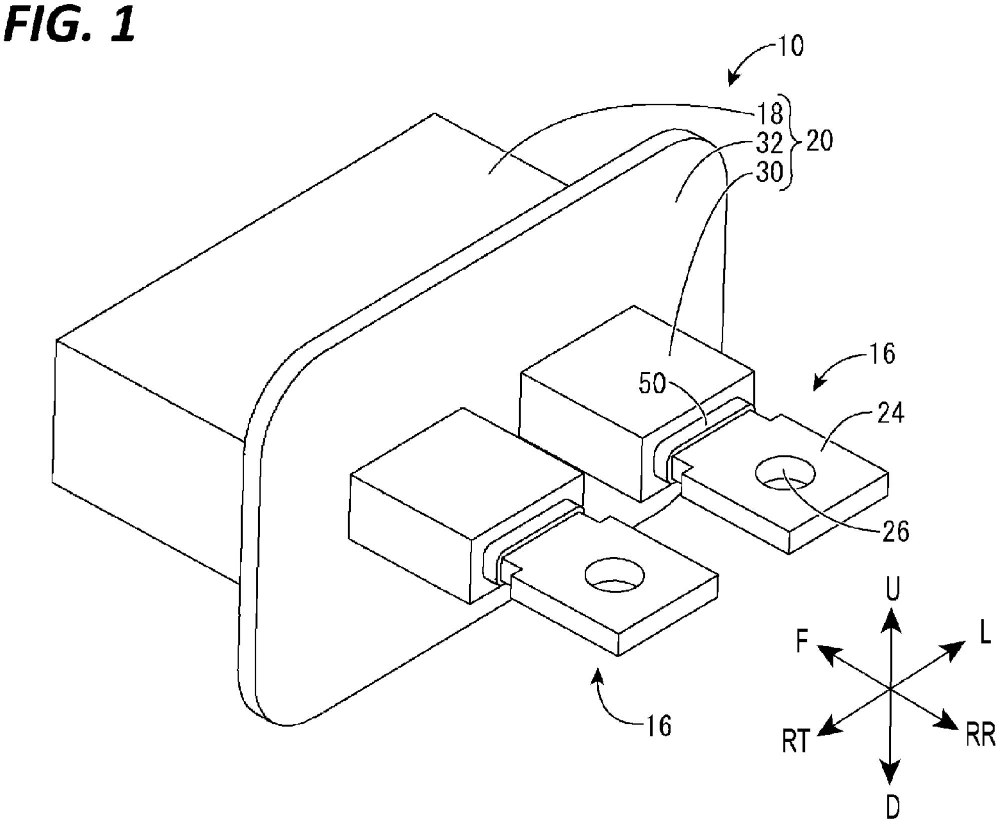
FIG. 1 is an overall perspective view showing a shield connector according to one embodiment.
Figure 2:
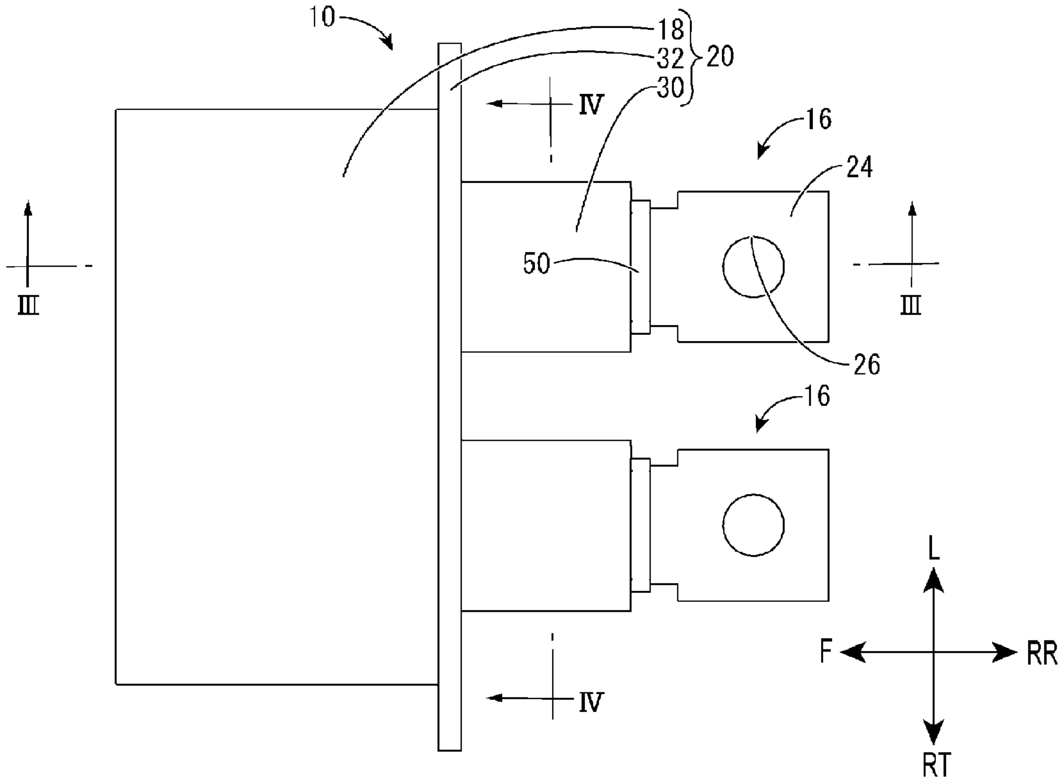
FIG. 2 is a plan view of FIG. 1.

First, embodiments of the present disclosure are listed and described.

(1) The shield connector of the present disclosure is provided with a terminal including a connecting portion to be connected to a mating terminal on a tip side and a fixing portion on a base end side, a shield shell including a tubular receptacle for surrounding the connecting portion of the terminal and a holding tube portion for surrounding the fixing portion of the terminal, a filling resin portion for integrally fixing the fixing portion of the terminal to the holding tube portion of the shield shell by filling between facing surfaces of the fixing portion of the terminal and the holding tube portion of the shield shell, and a finger touch preventing resin portion integrated with the filling resin portion, the finger touch preventing resin portion projecting from a tip surface of the connecting portion of the terminal.

According to the shield connector of the present disclosure, the shield shell and the terminal are integrated by the filling resin portion for filling between the facing surfaces of the fixing portion of the terminal and the holding tube portion of the shield shell. Thus, a fixing structure for the shield shell and the terminal is simplified and the entire shield connector can be reduced in size. Moreover, the finger touch preventing resin portion integrated with the filling resin portion projects from the tip surface of the terminal as a finger touch prevention measure. In this way, even if fingers enter through an opening on a tip side of the receptacle of the shield shell, the fingers contact the finger touch preventing resin portion before contacting the tip surface of the terminal and the touch of the fingers with the terminal can be advantageously suppressed or prevented. Since the finger touch preventing resin portion is integrated with the filling resin portion here, a separate component is not required unlike a conventional structure and it is also possible to reduce the number of components and assembling man-hours.

(2) Preferably, the connecting portion of the terminal has a flat plate shape extending in a longitudinal direction of the terminal while having a rectangular cross-section, and the finger touch preventing resin portion includes a front part expanding over an entire length in a width direction of the tip surface of the connecting portion and a pair of side parts extending from both end parts in the width direction of the front part to the filling resin portion along both side surfaces of the terminal. This is because the finger touch preventing resin portion can be provided entirely around the connecting portion of the terminal accommodated in the receptacle while the integration of the finger touch preventing resin portion and the filling resin portion is advantageously realized, and finger touch prevention property can be more advantageously realized.

(3) Preferably, a lower surface of the connecting portion of the terminal and a lower end part of the tip surface and lower end parts of the both side surfaces of the connecting portion are exposed from the finger touch preventing resin portion. In injection-molding the filling resin portion and the finger touch preventing resin portion in a mold, the entire lower surface of the connecting portion of the terminal can be stably held by the mold arranged in a gap between the lower surface of the connecting portion of the terminal and the receptacle. Further, since the lower end part of the tip surface and the lower end parts of the both side surfaces of the connecting portion can be gripped by the mold, the terminal can be more advantageously and stably positioned at the time of injection molding. As a result, a gap between the fixing portion of the terminal and the holding tube portion of the shield shell to be filled by the filling resin portion can be made as small as possible, and a thin and uniform thickness of the filling resin portion can be advantageously achieved. An improvement in heat dissipation from the terminal to the shield shell by the thin filling resin portion can also be expected.

(4) Preferably, a tip side of an upper surface of the connecting portion of the terminal is exposed from the finger touch preventing resin portion, and a base end surface of the upper surface is covered by an upper coupling portion of the finger touch preventing resin portion extending over an entire length in the width direction of the upper surface to couple between the pair of side parts. The tip side of the upper surface of the connecting portion is exposed from the finger touch preventing resin portion and connectability to the mating terminal can be ensured. Further, by covering the base end side of the upper surface by the upper coupling portion of the finger touch preventing resin portion, it is possible to achieve an improvement in the integrity of the terminal and the shield shell by the cooperation of the filling resin portion and the finger touch preventing resin portion and an improvement in insulation between the shield shell and the terminal.

(5) Preferably, a pair of the connecting portions of a pair of the terminals are arranged and accommodated in parallel in the single receptacle of the shield shell, and the finger touch preventing resin portions for respectively covering the pair of connecting portions are integrated with each other. The pair of connecting portions of the pair of terminals adjacently arranged can be integrally held by the finger touch preventing resin portions, and the integrity of the terminals and the shield shell by the cooperation of the filling resin portions and the finger touch preventing resin portions can be more advantageously improved.

Details of Embodiment of Present Disclosure

A specific example of a shield connector of the present disclosure is described below with reference to the drawings. Note that the present disclosure is not limited to these illustrations, but is represented by claims and intended to include all changes in the scope of claims and in the meaning and scope of equivalents.

Embodiment

Figure 3:
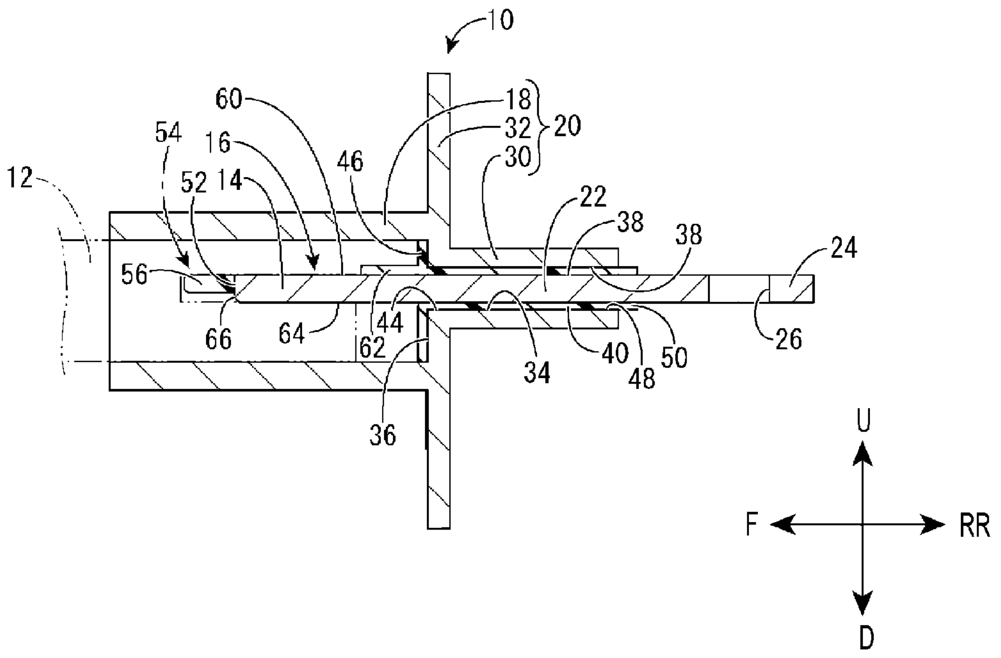
FIG. 3 is a section along in FIG. 2.
Figure 4:
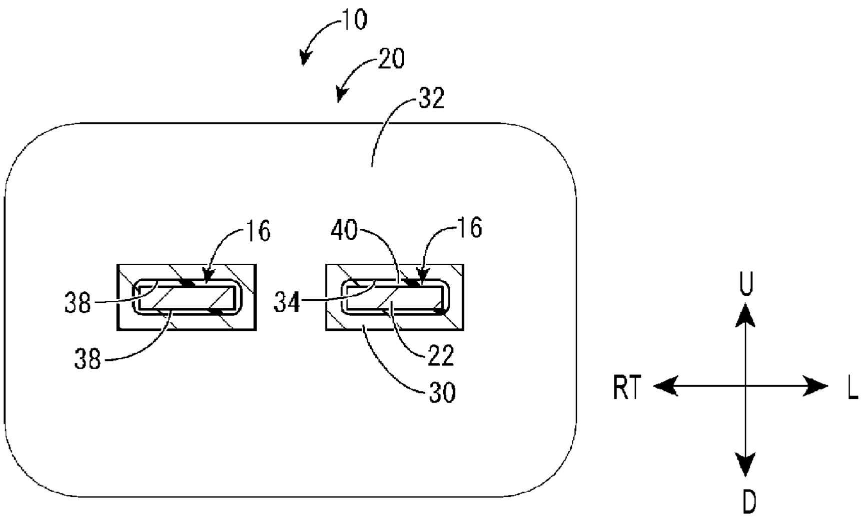
FIG. 4 is a section along IV-IV in FIG. 2.
Figure 5:
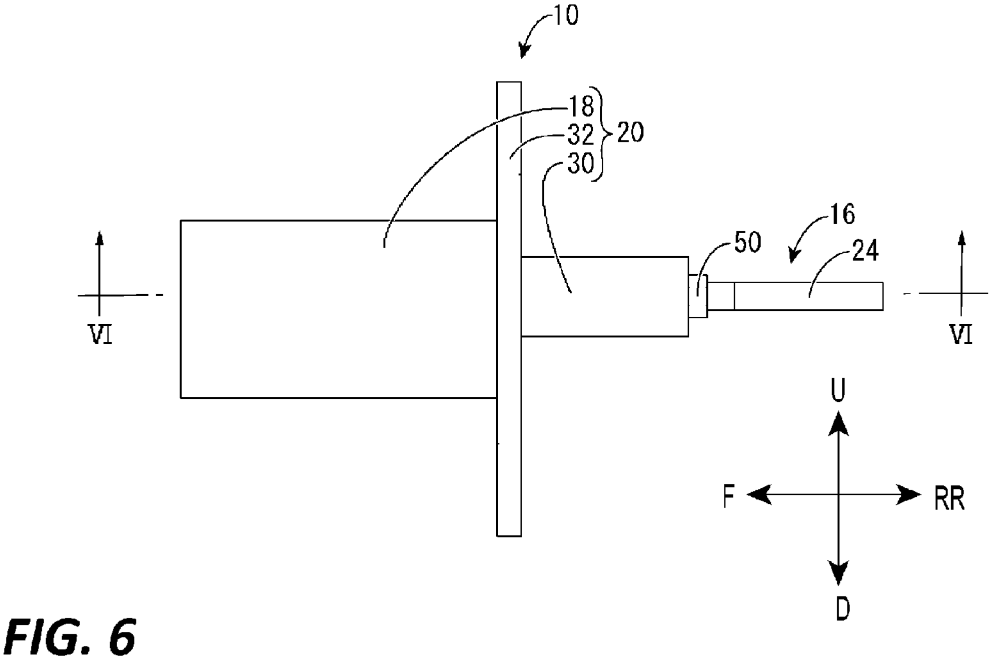
FIG. 5 is a right side view of FIG. 1.

Hereinafter, a shield connector 10 of one embodiment of the present disclosure is described using FIGS. 1 to 8. As shown in FIGS. 1 and 3, the shield connector 10 is provided with a pair of terminals 16, 16 each including a connecting portion 14 to be connected to a mating terminal 12 on a tip side, and a shield shell 20 including a receptacle 18 in the form of a rectangular tube for surrounding the connecting portions 14 of the terminals 16. Note that the shield connector 10 can be arranged in an arbitrary orientation, but a vertical direction, a lateral direction and a front-rear direction are described below based on a vertical direction, a lateral direction and a front-rear direction shown in figures. Further, for a plurality of identical members, only some members may be denoted by a reference sign and the other members may not be denoted by the reference sign. Furthermore, the mating terminal 12 is shown only in FIG. 3 and drawn by an imaginary line to facilitate understanding.

Terminal 16

Figure 6:
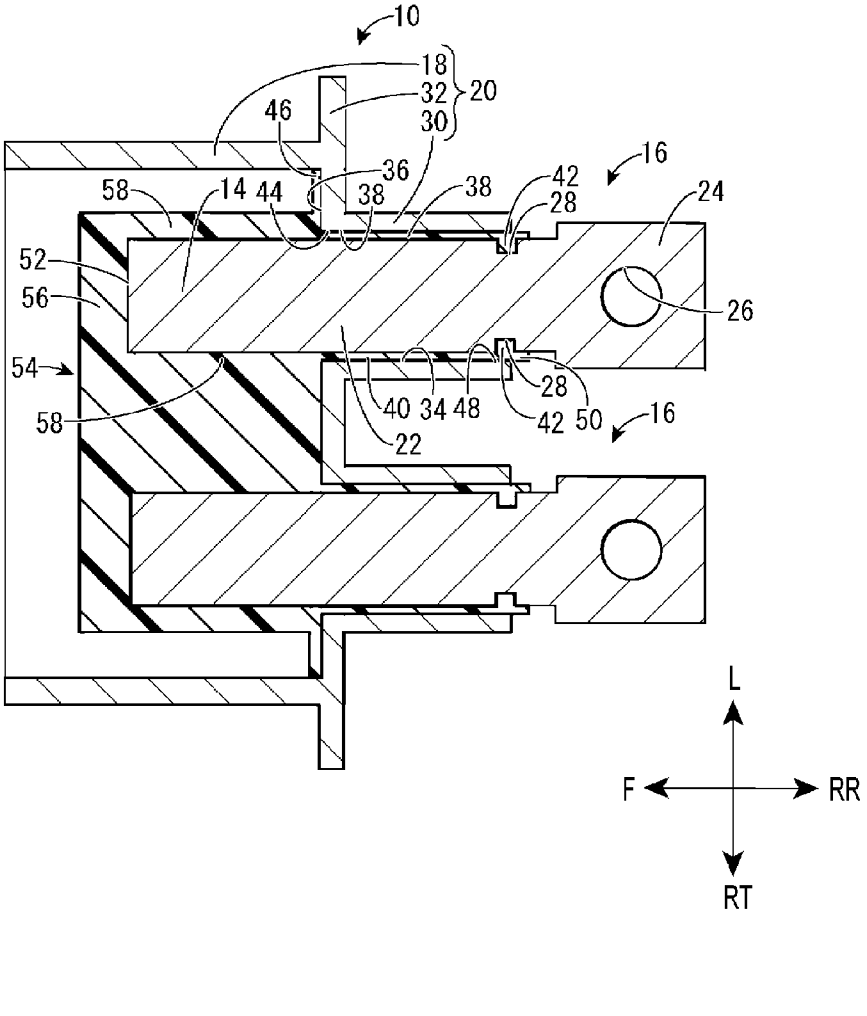
FIG. 6 is a section along VI-VI in FIG. 5.

As shown in FIGS. 3 and 6, the terminal 16 has a flat plate shape. A metal material such as copper, copper alloy, aluminum, aluminum alloy or stainless steel can be appropriately used as a material of the terminal 16. A surface processing such as silver plating, tin plating or aluminum plating may be applied to the terminal 16 according to the type of the constituent metal and a use environment. The terminal 16 can be formed, for example, by press-stamping a metal plate excellent in electrical conductivity. The terminal 16 includes, on the tip side (front side in FIG. 3), the connecting portion 14 having a flat plate shape extending in a longitudinal direction (front-rear direction in FIGS. 3 and 6) of the terminal 16 while having a rectangular cross-section. Further, the terminal 16 includes a fixing portion 22 connected to the rear end of the connecting portion 14 on a base end side (rear side in FIG. 3). The fixing portion 22 has a flat plate shape extending in the longitudinal direction of the terminal 16 while having a rectangular cross-section. Further, the terminal 16 is formed with a fastening portion 24 connected to the rear end of the fixing portion 22 and having a rectangular flat plate shape on the more base end side (rear end side in FIG. 3) than the fixing portion 22. The fastening portion 24 includes a bolt insertion hole 26 penetrating in a central part, projects from the shield shell 20 to be exposed to outside, and is fastened to a terminal of an unillustrated in-vehicle device. In addition, as shown in FIG. 6, the terminal 16 is provided with recesses 28 penetrating through outer surfaces, i.e. in a plate thickness direction, and open outward in a plate width direction on both end parts in the plate width direction of an end part of the fixing portion 22 on the side of the fastening portion 24.

Shield Shell 20

As shown in FIGS. 1 to 6, the terminal 16 is used by being accommodated into the shield shell 20 of the terminal block 10. The shield shell 20 is formed of electrically conductive metal. The shield shell 20 includes the single receptacle 18 for accommodating the connecting portions 14 of the pair of terminals 16 in parallel in the plate width direction on a front side, and a pair of holding tube portions 30, 30 in the form of rectangular tubes configured to surround the fixing portions 22 of the terminals 16 and separated in the plate width direction on a rear side. The receptacle 18 is larger than the holding tube portions 30. Further, the shield shell 20 is provided with a fixing projection piece 32 expanding into a flange shape in a direction orthogonal to the receptacle 18 and the pair of holding tube portions 30, 30 between the receptacle 18 and the pair of holding tube portions 30, 30. The fixing projection piece 32 is provided with a pair of communication holes 34, 34 allowing communication between the receptacle 18 and the insides of the pair of holding tube portions 30, 30, and the communication hole 34 is formed over the entire surface of the bottom wall of the holding tube portion 30. As shown in FIG. 3, the communication hole 34 is formed at a somewhat upper position of a bottom surface 36 of the receptacle 18. The fixing projection piece 32 of the shield shell 20 is mounted on a case or the like of an unillustrated in-vehicle device.

Filling Resin Portion 40

As shown in FIGS. 3 and 6, a synthetic resin is filled into between facing surfaces 38, 38 of the fixing portion 22 of the terminal 16 and the holding tube portion 30 of the shield shell 20, thereby forming a filling resin portion 40. The fixing portion 22 of the terminal 16 is integrally fixed to the holding tube portion 30 of the shield shell 20 by the filling resin portion 40. Further, as shown in FIG. 6, the filling resin portion 40 is also filled in the pair of recesses 28, 28 provided at the rear end of the fixing portion 22 of the terminal 16 and includes engaging protrusions 42 filling the recesses 28. As a result, the fixing portion 22 of the terminal 16 is firmly fixed to the holding tube portion 30 of the shield shell 20. Further, as shown in FIGS. 3 and 6, the filling resin portion 40 includes a flange portion 46 projecting from a first opening 44 of the holding tube portion 30 on the side of the receptacle 18 and expanding to cover the bottom surface 36 of the receptacle 18. In addition, the filling resin portion 40 includes a projecting portion 50 projecting from a second opening 48 of the holding tube portion 30 on a side opposite to the receptacle 18 and exposed to outside. In this way, the filling resin portion 40 is reliably filled between the facing surfaces 38 and 38, and the fixing portion 22 of the terminal 16 is more firmly fixed to the holding tube portion 30 of the shield shell 20.

Finger Tough Preventing Resin Portion 54

As shown in FIGS. 3 and 6, a finger touch preventing resin portion 54 made of synthetic resin and projecting from tip surfaces 52 is provided on the connecting portions 14 of the terminals 16. As shown in FIG. 6, the finger touch preventing resin portion 54 is integrally formed to the filling resin portions 40. That is, the finger touch preventing resin portion 54 for covering each of the pair of connecting portions 14, 14 of the terminals 16 is integrated with the filling resin portions 40 formed between the facing surfaces 38 and 38 of the fixing portions 22 of the terminals 16 and the holding tube portions 30 of the shield shell 20. Further, as shown in FIG. 6, the finger touch preventing resin portion 54 includes a front part 56 expanding over the entire lengths in the plate width direction of the tip surfaces 52 of the connecting portions 14 and pairs of side parts 58, 58 extending from both end parts in the plate width direction of the front part 56 to the filling resin portions 40 on the bottom surface 36 along the entire lengths of the both side surfaces of the connecting portions 14. That is, as shown in FIGS. 3, 7 and 8, a tip side of an upper surface 60 of the connecting portion 14 of the terminal 16 is exposed from the finger touch preventing resin portion 54, and a base end side of the upper surface of the terminal 16 is covered by an upper coupling portion 62 of the finger touch preventing resin portion 54 extending over the entire length in the plate width direction of the upper surface 60 to couple between the pair of side parts 58, 58.

Figure 7:
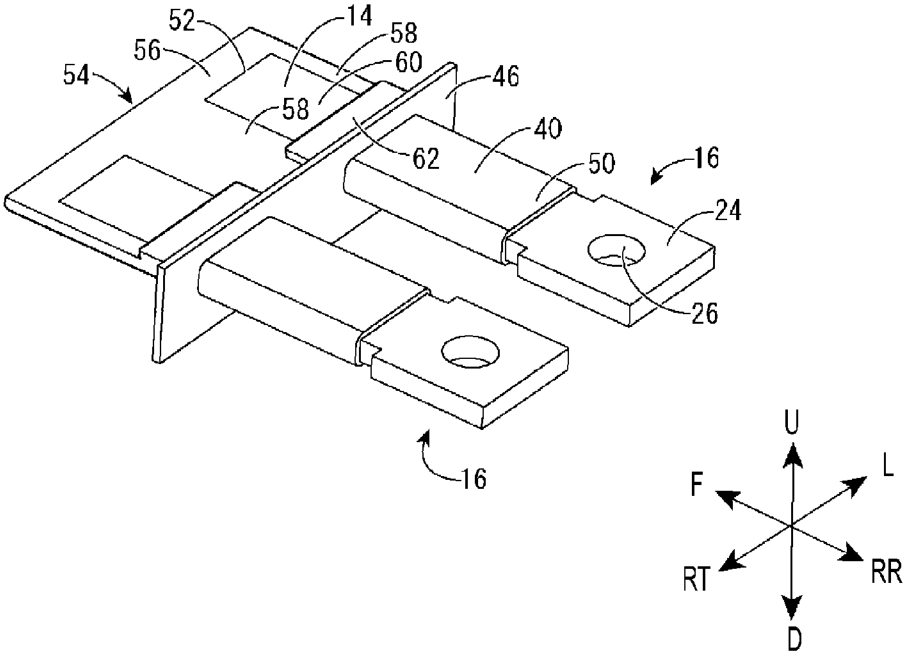
FIG. 7 is a perspective view with a shield shell removed from FIG. 1.
Figure 8:
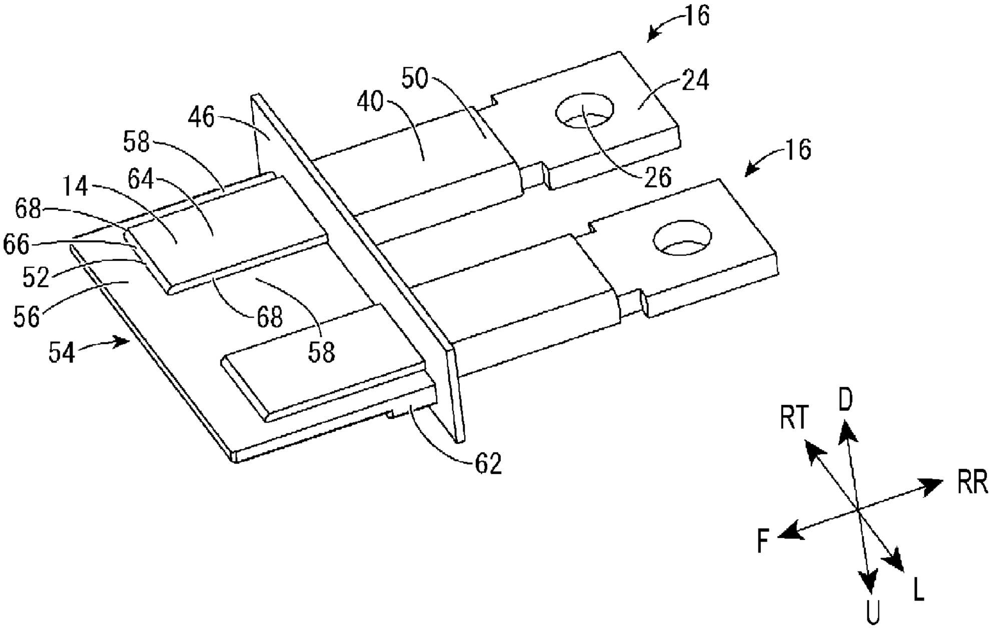
FIG. 8 is a perspective view of FIG. 7 viewed from another direction.

Further, as shown in FIGS. 3, 7 and 8, the finger touch preventing resin portion 54 is not provided for a lower surface 64 of the connecting portion 14 of the terminal 16, a lower end part 66 of the tip surface 52 of the connecting portion 14 and lower end parts 68 of the both side surfaces of the connecting portion 14, and the connecting portion 14 is exposed there.

Manufacturing Method of Shield Connector 10

One embodiment of a manufacturing method of the shield connector 10 is described. First, the single shield shell 20 and the pair of terminals 16, 16 formed into predetermined shapes are prepared. Note that the shield connector 10 is manufactured, for example, using unillustrated two molds. More particularly, the two molds are composed of the mold arranged on a front side and the mold arranged on a rear side. Subsequently, the pair of terminals 16, 16 are inserted through the pair of communication holes 34, 34 of the single shield shell 20. In this state, the two molds are so arranged that the pair of terminals 16, 16 are at predetermined positions with respect to the single shield shell 20. That is, in this state, parts of the single shield shell 20 and the pair of terminals 16, 16 not covered by the filling resin portions 40 and the finger touch preventing resin portion 54 are covered by the two molds. Then, by injecting/filling the resin into a gap formed by the two molds, the shield connector 10 is completed.

According to the shield connector 10 of the present disclosure thus structured, the filling resin portions 40 are formed between the facing surfaces 38 and 38 of the fixing portions 22 of the terminals 16 and the holding tube portions 30 of the shield shell 20 by filling the synthetic resin. In this way, the fixing portions 22 of the terminals 16 are integrally fixed to the holding tube portions 30 of the shield shell 20. Thus, a fixing structure for the shield shell 20 and the terminals 16 can be simplified and the entire shield connector 10 can be reduced in size. Further, the finger touch preventing resin portion 54 serving as a finger touch prevention measure is provided to project from the tip surfaces 52 of the connecting portions 14 of the terminals 16. Therefore, even if fingers are inserted through an opening on a tip side of the receptacle 18 of the shield shell 20, the touch of the fingers with the terminals 16 can be advantageously suppressed or prevented since the fingers contact the front part 56 of the finger touch preventing resin portion 54 before contacting the terminals 16 of the shield shell 20.

Moreover, since the finger touch preventing resin portion 54 is integrated with the filling resin portions 40, a separate component is not required unlike a conventional structure and it is also possible to reduce the number of components and assembling man-hours. That is, the finger touch preventing resin portion 54 for covering each of the pair of connecting portions 14, 14 of the terminals 16 is integrated with the filling resin portions 40 formed between the facing surfaces 38 and 38 of the fixing portions 22 of the terminals 16 and the holding tube portions 30 of the shield shell 20. Thus, an improvement in the integrity of the terminals 16 and the shield shell 20 by the cooperation of the finger touch preventing resin portion 54 and the filling resin portions 40 can be more advantageously achieved. In addition, since the finger touch preventing resin portion 54 can be provided entirely around the connecting portions 14 of the terminals 16 accommodated in the receptacle 18 by the front part 56 and the side parts 58 of the finger touch preventing resin portion 54, finger touch prevention property can be more advantageously realized.

Further, since the tip sides of the upper surfaces 60 and the entire lower surfaces 64 of the connecting portions 14 of the terminals 16 are exposed from the finger touch preventing resin portion 54, connectability to the mating terminals 12 can be ensured (see FIG. 3). Further, the base end sides of the upper surfaces 60 are covered by the upper coupling portions 62 of the finger touch preventing resin portion 54. In this way, it is possible to achieve an improvement in the integrity of the terminals 16 and the shield shell 20 by the cooperation of the finger touch preventing resin portion 54 and the filling resin portions 40 and an improvement in insulation between the shield shell 20 and the terminals 16.

In addition, the molds are arranged between the lower surfaces 64 of the connecting portions 14 of the terminals 16 and the receptacle 18 of the shield shell 20 in manufacturing the shield connector 10, whereby the entire lower surfaces 64 of the connecting portions 14 of the terminals 16 can be stably held. Moreover, since the lower end parts 66 of the tip surfaces 52 of the connecting portions 14 and the lower end parts 68 of the both side surfaces of the connecting portions 14 can also be gripped by the molds, the terminals 16 can be more advantageously and stably positioned at the time of manufacturing (injection molding). In this way, gaps between the facing surfaces 38 and 38 of the fixing portions 22 of the terminals 16 and the holding tube portions 30 of the shield shell 20 can be made as small as possible, and thin and uniform thicknesses of the filling resin portions 40 can be advantageously achieved. Further, an improvement in heat dissipation from the fixing portions 22 of the terminals 16 to the shield shell 20 through the thin filling resin portions 40 can also be expected.

Modifications

Although the embodiment has been described in detail as a specific example of the present disclosure above, the present disclosure is not limited by this specific description. The present disclosure encompasses modifications, improvements and the like within such a range that the aim of the present disclosure can be achieved. For example, the following modifications of the embodiment are also included in the technical scope of the present disclosure.

(1) Although the pair of terminals 16 are provided in the above embodiment, one, three or more terminals may be provided. Further, the receptacle 18 is not limited to the single one, and a plurality of receptacles for individually surrounding the plurality of connecting portions 14 may be used.

(2) Although the shield shell 20 is arranged on the outermost side in the above embodiment, there is no limitation to this. The shield shell 20 may be accommodated in a housing made of synthetic resin.

(3) Although an example in which the shield connector 10 is used as a terminal block by being mounted in the in-vehicle device is described in the above embodiment, the shield connector 10 can be, of course, used as a shield connector to be mounted on an end of a shielded cable.

(4) The pair of connecting portions 14, 14 of the pair of terminals 16, 16 may be arranged in parallel in the plate thickness direction. Also in this case, the integrity of the terminals 16 and the shield shell 20 by the cooperation of the finger touch preventing resin portion 54 and the filling resin portions 40 may be improved by integrally holding the pair of connecting portions 14, 14 of the pair of terminals 16, 16 adjacently arranged by the finger touch preventing resin portion 54.

LIST OF REFERENCE NUMERALS

10 shield connector
12 mating terminal
14 connecting portion
16 terminal
18 receptacle
20 shield shell
22 fixing portion
24 fastening portion
26 bolt insertion hole
28 recess
30 holding tube portion
32 fixing projection piece
34 communication hole
36 bottom surface
38 facing surface
40 filling resin portion
42 engaging protrusion
44 first opening
46 flange portion
48 second opening
50 projecting portion
52 tip surface
54 finger touch preventing resin portion
56 front part
58 side part
60 upper surface
62 upper coupling portion
64 lower surface
66 lower end part
68 lower end part

What is claimed is:

1. A shield connector, comprising:

a terminal including a connecting portion to be connected to a mating terminal on a tip side and a fixing portion on a base end side;

a shield shell including a tubular receptacle for surrounding the connecting portion of the terminal and a holding tube portion for surrounding the fixing portion of the terminal;

a filling resin portion for integrally fixing the fixing portion of the terminal to the holding tube portion of the shield shell by filling between facing surfaces of the fixing portion of the terminal and the holding tube portion of the shield shell; and a finger touch preventing resin portion integrated with the filling resin portion, the finger touch preventing resin portion projecting from a tip surface of the connecting portion of the terminal, wherein an upper surface of the finger touch preventing resin portion is at a substantially same plane as an upper surface of the connecting portion.

2. The shield connector of claim 1, wherein:

the connecting portion of the terminal has a flat plate shape extending in a longitudinal direction of the terminal while having a rectangular cross-section, and the finger touch preventing resin portion includes a front part expanding over an entire length in a width direction of the tip surface of the connecting portion and a pair of side parts extending from both end parts in the width direction of the front part to the filling resin portion along both side surfaces of the terminal.

3. The shield connector of claim 2, wherein a lower surface of the connecting portion of the terminal and a lower end part of the tip surface and lower end parts of the both side surfaces of the connecting portion are exposed from the finger touch preventing resin portion.

4. The shield connector of claim 2, wherein a tip side of an upper surface of the connecting portion of the terminal is exposed from the finger touch preventing resin portion, and a base end surface of the upper surface is covered by an upper coupling portion of the finger touch preventing resin portion extending over an entire length in the width direction of the upper surface to couple between the pair of side parts.

5. The shield connector of claim 2, wherein a pair of the connecting portions of a pair of the terminals are arranged and accommodated in parallel in the single receptacle of the shield shell, and the finger touch preventing resin portions for respectively covering the pair of connecting portions are integrated with each other.

6. The shield connector of claim 1, wherein a lower surface of the finger touch preventing resin portion is at a higher plane than a lower surface of the connecting portion.

* * * * *